United States Patent
Yao et al.

(10) Patent No.: US 10,324,546 B2
(45) Date of Patent: Jun. 18, 2019

(54) CURSOR GENERATION SYSTEM, CURSOR GENERATION METHOD, AND NON-TRANSITORY COMPUTER READABLE STORAGE MEDIUM

(71) Applicant: Chicony Electronics Co., Ltd., New Taipei (TW)

(72) Inventors: Shun-Yi Yao, New Taipei (TW); Yi-Hung Wang, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 98 days.

(21) Appl. No.: 15/334,944

(22) Filed: Oct. 26, 2016

(65) Prior Publication Data

US 2018/0032154 A1 Feb. 1, 2018

(30) Foreign Application Priority Data

Jul. 29, 2016 (TW) .............................. 105124256 A (51) Int. Cl.
*G06F 3/038* (2013.01)
*G06F 3/0346* (2013.01)
*G06F 3/0354* (2013.01)
*G06F 3/0481* (2013.01)
*G09G 5/08* (2006.01)

(52) U.S. Cl.
CPC ............ *G06F 3/0383* (2013.01); *G06F 3/038* (2013.01); *G06F 3/0346* (2013.01);
(Continued)

(58) Field of Classification Search
CPC ........ G06F 3/03; G06F 3/0317; G06F 3/0321; G06F 3/0346; G06F 3/0354;
(Continued)

(56) References Cited

U.S. PATENT DOCUMENTS

| 6,593,908 B1 * | 7/2003 | Borgstrom .............. G06F 3/038 345/156 |
| 2006/0007151 A1 * | 1/2006 | Ram ...................... G06F 3/038 345/163 |

(Continued)

*Primary Examiner* — Nathan Danielsen
(74) *Attorney, Agent, or Firm* — Muncy, Geissler, Olds & Lowe, P.C.

(57) ABSTRACT

A cursor generation system includes a digital pen and a computer device. The digital pen includes recognition information, a first wireless communication module, and a displacement sensor. The first wireless communication module is for transmitting a mating request signal, the recognition information, and the displacement information. The computer device includes a cursor application, a processer, a second wireless communication module, and a display. The second wireless communication module mates with the first wireless communication module to receive the recognition information and the displacement information. The processer executes the cursor application corresponding to the recognition information to register a vendor-defined usage page associated with the digital pen. The processor executes the cursor application to generate a cursor icon displaying on the display according to the vendor-defined usage page, reads the displacement information, and controls the shifting and displaying of the cursor icon on the display according to the vendor-defined usage page.

19 Claims, 11 Drawing Sheets

(52) U.S. Cl.
CPC ...... *G06F 3/03542* (2013.01); *G06F 3/03545* (2013.01); *G06F 3/04817* (2013.01); *G06F 2203/0382* (2013.01); *G06F 2203/0383* (2013.01); *G06F 2203/0384* (2013.01); *G09G 5/08* (2013.01)

(58) Field of Classification Search
CPC ............. G06F 3/03542; G06F 3/03545; G06F 3/03546; G06F 3/038–3/0386; G06F 3/0481; G06F 3/04817–3/0483; G06F 3/0484–3/0488; G06F 3/0489; G06F 3/04892; G06F 2203/0384; G06F 2203/04801; G06F 2203/04808
See application file for complete search history.

(56) References Cited

U.S. PATENT DOCUMENTS

| | | | | |
|---|---|---|---|---|
| 2006/0015569 | A1* | 1/2006 | Rhodus | H04N 1/00209 709/217 |
| 2006/0227121 | A1* | 10/2006 | Oliver | G06F 3/03545 345/179 |
| 2007/0216644 | A1* | 9/2007 | Nam | G06F 3/0386 345/158 |
| 2009/0115744 | A1* | 5/2009 | Zhang | G06F 3/03545 345/179 |
| 2015/0002397 | A1* | 1/2015 | Song | G06F 3/03543 345/163 |
| 2016/0077605 | A1* | 3/2016 | Chen | G06F 3/038 345/157 |

* cited by examiner

CURSOR GENERATION SYSTEM, CURSOR GENERATION METHOD, AND NON-TRANSITORY COMPUTER READABLE STORAGE MEDIUM

CROSS-REFERENCE TO RELATED APPLICATION

This non-provisional application claims priority under 35 U.S.C. § 119(a) to Patent Application No. 105124256 filed in Taiwan, R.O.C. on Jul. 29, 2016, the entire contents of which are hereby incorporated by reference.

BACKGROUND

Technical Field

The instant disclosure relates to a cursor system and, more particularly, to a cursor generation system, a cursor generation method, and a non-transitory computer readable storage medium.

Related Art

People usually use computers for brief reports on conference proceedings. Generally, a computer can be connected to a projector in order to project report data to a curtain or a wall. Alternatively, the computer can be connected to an external display (e.g., a large TV screen) in order to directly display report data on the display.

During a lecture, a speaker may use a laser pointer emitting laser beam to a curtain or a display on which report data display for indicating relative contents on the curtain or the display that the speaker talks about and wants to show attendees. However, during the use of the laser pointer, the laser beam may cause people being injured if the laser beam hits any one of the attendees' eyes accidently. Even reflection of a laser dot of the laser beam on the curtain or the display may lead to risks to human eyes.

SUMMARY

To address the above issue, a cursor generation system according to an embodiment is provided, which comprises a digital pen and a computer device. The digital pen comprises recognition information, a first wireless communication module, and a displacement sensor. The first wireless communication module is electrically connected to the displacement sensor. The displacement sensor detects a displacement of the digital pen to obtain displacement information. The first wireless communication module is for transmitting a mating request signal, the recognition information, and the displacement information. The computer device comprises a cursor application, a processer, a second wireless communication module, and a display. The cursor application is associated with the recognition information of the digital pen. The processor is respectively electrically connected to the second wireless communication module and the display. The second wireless communication module receives the mating request signal and mates with the first wireless communication module to wirelessly receive the recognition information and the displacement information. Wherein the processer executes the cursor application corresponding to the recognition information to register a vendor-defined usage page associated with the digital pen. Further, the processor executes the cursor application to generate a cursor icon displaying on the display according to the vendor-defined usage page. Further, the processor reads the displacement information and controls the shifting and displaying of the cursor icon on the display according to the vendor-defined usage page and the displacement information.

A cursor generation method according to an embodiment is provided, which comprises: receiving a mating request signal transmitted by a first wireless communication module of a digital pen by a computer device, wherein a second wireless communication module of the computer device receives the mating request signal and mates with the first wireless communication module, wherein the digital pen comprises a recognition information; executing a cursor application corresponding to the recognition information to register a vendor-defined usage page associated with the digital pen by the computer device; executing the cursor application to generate a cursor icon displaying on a display according to the vendor-defined usage page by the computer device; and receiving a displacement information from the digital pen by the second wireless communication module, wherein the computer device executes the cursor application to read the displacement information and control the shifting and displaying of the cursor icon on the display according to the vendor-defined usage page and the displacement information.

A non-transitory computer readable storage medium according to another embodiment is provided, which has a computer program, which, when implemented, causes a computer device to carry out a plurality of method steps comprising: registering a vendor-defined usage page associated with a digital pen, wherein the digital pen is an external device distinct from the computer device; generating a cursor icon displaying on a display of the computer device according to the vendor-defined usage page; and reading a displacement information from the digital pen and controlling the shifting and displaying of the cursor icon on the display according to the vendor-defined usage page and the displacement information.

According to the embodiments of the instant disclosure, when a digital pen mates with a computer device, a processor can execute a cursor application to register a vendor-defined usage page associated with the digital pen, by which the cursor application can generate a cursor icon displaying on a display according to the vendor-defined usage page and control the shifting of the cursor icon on the display according to the vendor-defined usage page and a displacement information of the digital pen; therefore, the digital pen need not emit any laser beam during reports and there is no risk to human eyes. The brightness of the cursor icon is unaffected by the display and won't weaken even if the distance between the digital pen and the display increases. As a result, the effect of indication is significantly improved and clearer.

DETAILED DESCRIPTION

Figure 1:
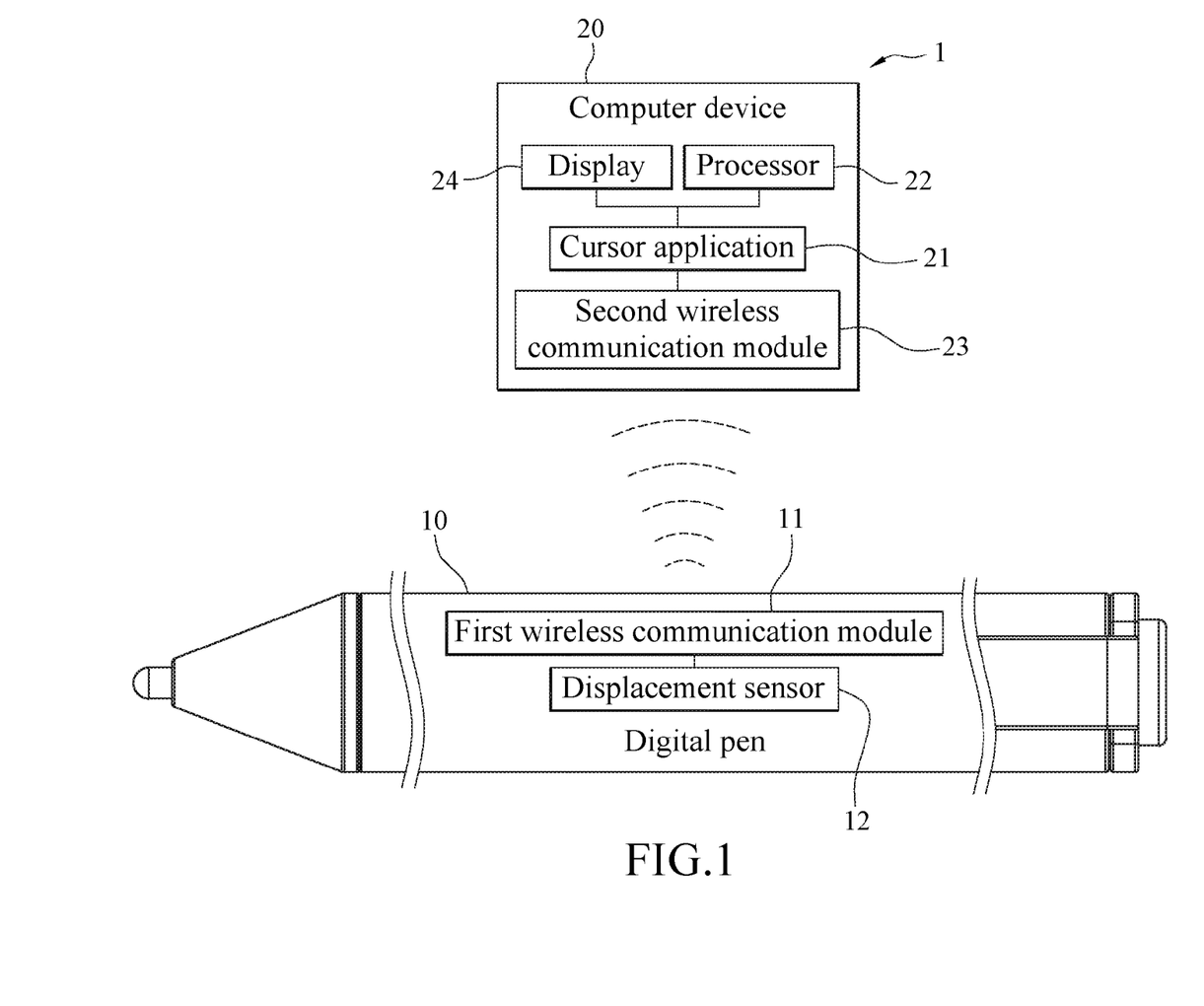
FIG. 1 illustrates a system block diagram of a cursor generation system according to a first embodiment of the instant disclosure.

Please refer to FIG. 1, which is a system block diagram of a cursor generation system according to a first embodiment of the instant disclosure. In the embodiment, the cursor generation system 1 comprises a digital pen 10 and a computer device 20. The computer device 20 can be an electronic device such as a smart phone, a tablet computer, or a laptop computer.

Figure 3:
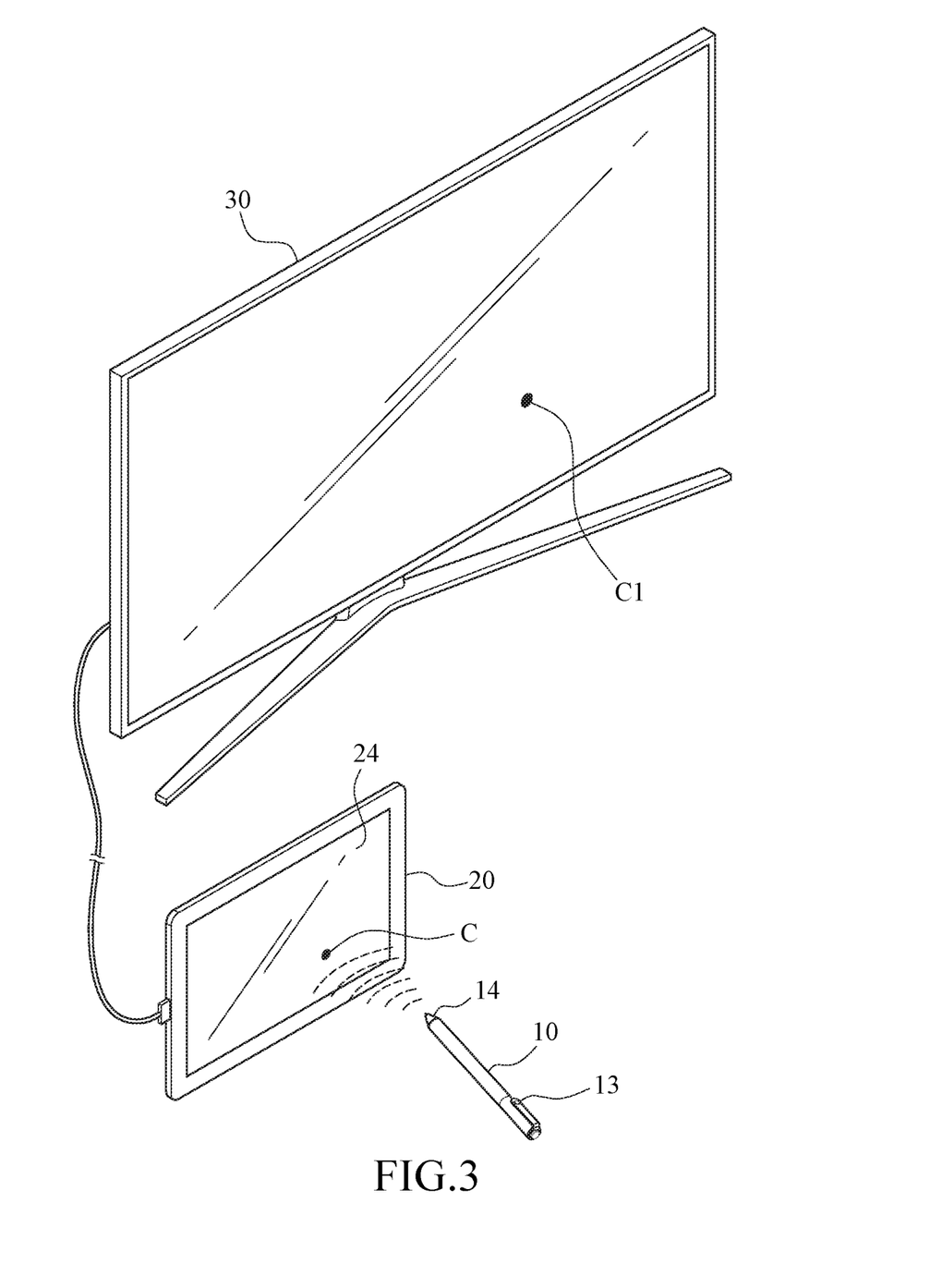
FIG. 3 illustrates a first perspective view regarding system operation of the cursor generation system according to the first embodiment of the instant disclosure.

As shown in FIG. 1, the digital pen 10 comprises a first wireless communication module 11 and a displacement sensor 12 which are disposed inside the digital pen 10. Additionally, the digital pen 10 comprises built-in recognition information (e.g., the recognition information is stored in a memory inside the digital pen 10). The recognition information can be a recognition code or a configuration descriptor (e.g., 0x00) for the digital pen 10 capable of being recognized by the computer device 20. The first wireless communication module 11 can be a Wi-Fi module, an 802.11 module, or a ZigBee module in practical to receive and transmit digital signals. The displacement sensor 12 can comprise a gyroscope or a g-sensor (accelerometer) to detect displacements of the digital pen 10 in three-dimensional space to obtain displacement information. For example, the displacement information can be continuous coordinate positions (X, Y) or displacement amount(s) (ΔX, ΔY). The first wireless communication module 11 is electrically connected to the displacement sensor 12 in a direct or indirect fashion and is for transmitting a mating request signal, the recognition information, and the displacement information to the computer device 20. As shown in FIG. 3, in an embodiment, the digital pen 10 can be a stylus with a stylus point 14, by which the digital pen 10 provides functions of writing and selecting files on a screen of the computer device 20.

As shown in FIG. 1, the computer device 20 comprises a cursor application 21, a processer 22, a second wireless communication module 23, and a display 24. In practical, the cursor application 21 can be an application downloadable from a network platform (e.g., the App store of Apple Inc.) or can be installed in a memory in the computer device 20 via a computer readable storage medium (e.g., a disc, a USB device, or a memory card). In addition, the cursor application 21 is associated with the recognition information of the digital pen 10 (describe below). The processor 22 is respectively electrically connected to the second wireless communication module 23 and the display 24. The processor 22 can be directly or indirectly connected to the second wireless communication module 23 and the display 24. For example, the processor 22 is, but not limited to, electrically connected to the second wireless communication module 23 by the cursor application 21. The second wireless communication module 23 can be a Wi-Fi module, an 802.11 module, or a ZigBee module in practical to receive and transmit digital signals. When the second wireless communication module 23 receives the mating request signal and mates with the first wireless communication module 11, the second wireless communication module 23 can establish a link with the first wireless communication module 11 to wirelessly receive the recognition information and the displacement information of the digital pen 10.

Figure 4:
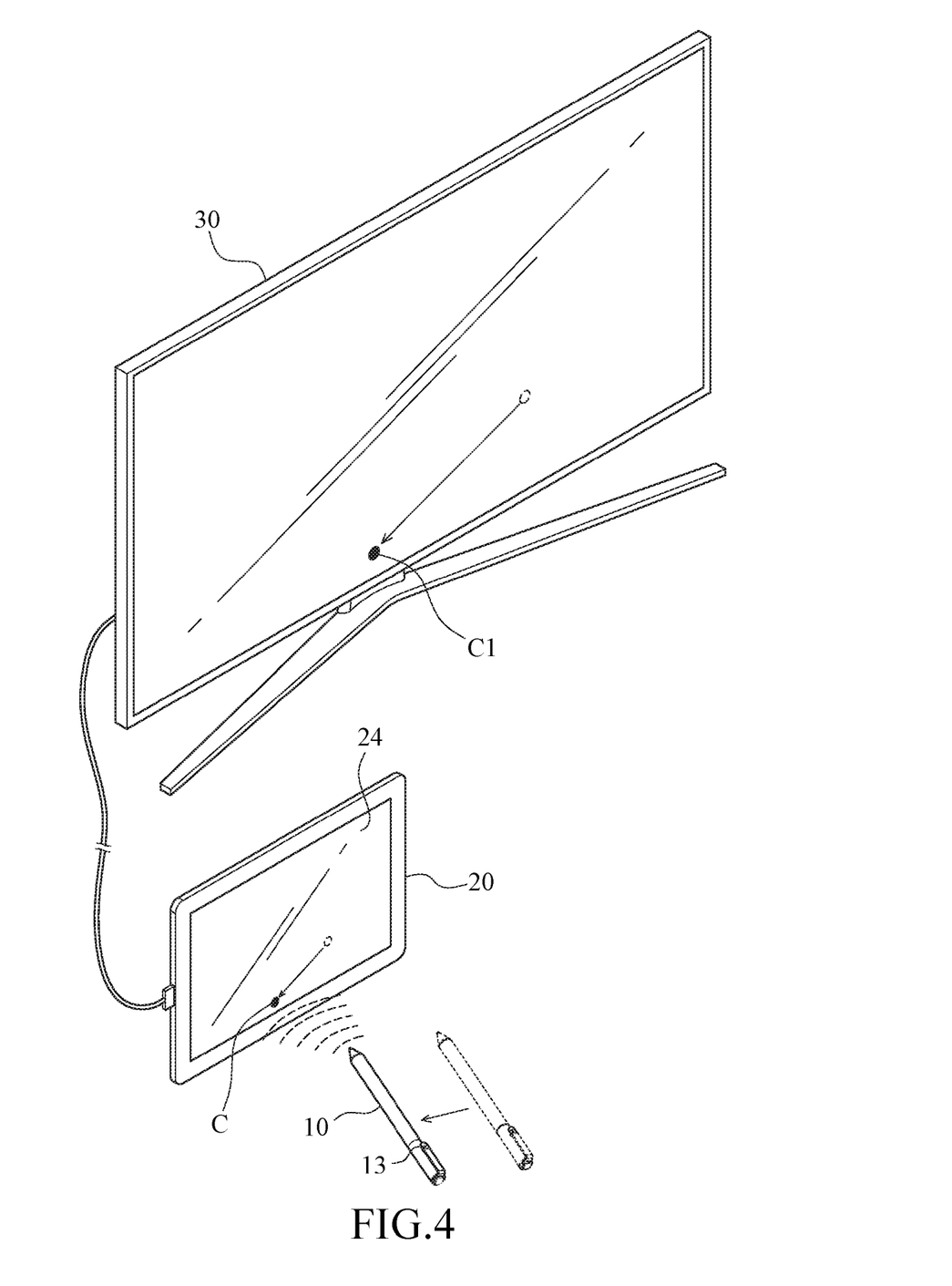
FIG. 4 illustrates a second perspective view regarding system operation of the cursor generation system according to the first embodiment of the instant disclosure.

Accordingly, the processor 22 can execute the cursor application 21 corresponding to the recognition information 21 to register a vendor-defined usage page associated with the digital pen 10. Further, the processor 22 can execute the cursor application 21 to generate a cursor icon C displaying on the display 24 according to the vendor-defined usage page (as shown in FIG. 3). Moreover, the processor 22 can read the displacement information and correspondingly control the shifting and displaying of the cursor icon C on the display 24 according to the vendor-defined usage page (as shown in FIG. 4).

Figure 2:
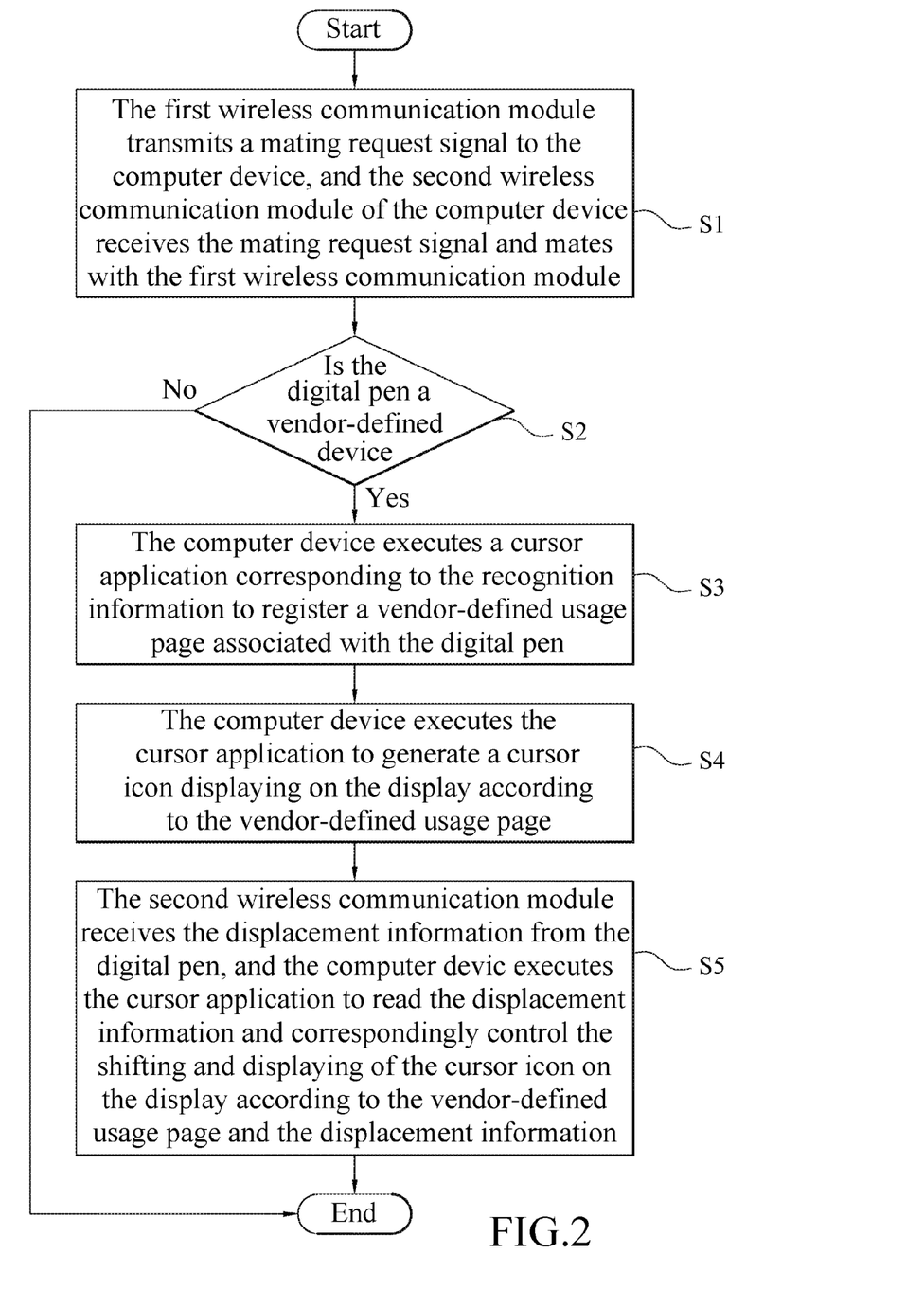
FIG. 2 illustrates a flow chart of a cursor generation method according to the first embodiment of the instant disclosure.

Please refer to FIG. 1 and FIG. 2 for further illustration of the above embodiment. FIG. 2 is a flow chart of a cursor generation method according to the first embodiment of the instant disclosure. Hardware and structures described below can be referred to the above description of the cursor generation system 1. In an embodiment, a user need to use the computer device 20 for brief reports on a conference proceeding. As shown in FIG. 3, the computer device 20 is a tablet computer and, like most of conference proceedings, the computer device 20 is connected to an extended display 30 (e.g., a large TV screen or a projector curtain), which is beneficial to attendees for watching. A speaker can have the digital pen 10 mate with the computer device 20 (to do so, for example, the speaker can press a switch of the digital pen 10). As step S1: when the digital pen 10 is operated by the user, the first wireless communication module 11 transmits a mating request signal to the computer device 20, and the second wireless communication module 23 of the computer device 20 receives the mating request signal and mates with the first wireless communication module 11. Under the circumstances, a link between the first wireless communication module 11 and the second wireless communication module 23 is established, and signals and information can be transmitted between the first wireless communication module 11 and the second wireless communication module 23.

Next, as step S2: the computer device 20 recognizes the digital pen 10 to determine whether the digital pen 10 is a vendor-defined device. Specifically, after the link between the first wireless communication module 11 and the second wireless communication module 23 is established, the first wireless communication module 11 can transmit the recognition information (e.g., a recognition code or a configuration descriptor) of the digital pen 10 to the computer device 20, and the computer device 20 can compare built-in information with the recognition information to determine whether the digital pen 10 is a vendor-defined device. Please refer to Table 1 for an illustration.

TABLE 1

(Generic Desktop Usage Page)

| Usage ID | Usage Name | Usage Type | Section |
|---|---|---|---|
| 00 | Undefined | | |
| 01 | Pointer | CP | 4.1 |
| 02 | Mouse | CA | 4.1 |
| 03 | Reserved | | |
| 04 | Joystick | CA | 4.1 |
| 05 | Game Pad | CA | 4.1 |
| 06 | Keyboard | CA | 4.1 |
| 07 | Keypad | CA | 4.1 |
| 08 | Multi-Axis Controller | CA | 4.1 |
| 09 | Tablet PC System Controls | CA | 4.1 |
| 0A-2F | Reserved | | |

Generally, the computer devices 20 comprise a built-in generic desktop usage page as shown in Table 1, by which when a generic mouse or a generic keyboard is connected to the computer device 20, the mouse or the keyboard can be functional correspondingly according to the generic desktop usage page. For example, when the generic mouse is connected to the computer device 20, a mouse cursor icon is generated and can be controlled by the mouse. When the generic keyboard is connected to the computer device 20, a user can use the keyboard to type immediately. The computer device 20 can determine whether the digital pen 10 is a vendor-defined device according to the recognition information of the digital pen 10 and the built-in information of the computer device 20. For example, if the computer device 20 finds out that the built-in information has no the recognition information, the computer device 20 determines that the digital pen 10 is a vendor-defined device. In the embodiment, the digital pen 10 is a vendor-defined device but not a generic device (e.g., a generic mouse or a generic keyboard) corresponding to the generic desktop usage page; therefore, the computer device 20 can determine that the digital pen 10 is a vendor-defined device according to the recognition information of the digital pen 10.

Next, as step S3: the computer device 20 executes a cursor application 21 corresponding to the recognition information to register a vendor-defined usage page associated with the digital pen 10. In other words, the computer device 20 determines that the digital pen 10 is the vendor-defined device but not a generic device according to the recognition information. Thus, the computer device 20 has to execute the cursor application 21 corresponding to the digital pen 10 to register the vendor-defined usage page associated with the digital pen 10 (i.e., the cursor application 21 is corresponding to the recognition information of the digital pen 10). The cursor application 21 can be, but not limited to, manually executed by a user, automatically executed when the computer device 20 is turned on, or executed once when the computer device 20 determines that the digital pen 10 is a vendor-defined device. In some embodiments, the computer device 20 can determine whether the digital pen 10 is a vendor-defined device according to the vendor-defined usage page in an auxiliary fashion. The vendor-defined usage page can be referred to Table 2 below.

TABLE 2

(Vendor-defined Usage Page)

| Page ID | Page Name |
|---|---|
| 1 | Generic Desktop Controls |
| ... | |
| 91 | Arcade Page |
| 92-FEFF | Reserved |
| FF00-FFFF | Vendor-Defined |

Generally, the vendor-defined usage page is reserved for definition and declaration by vendors (blocks FF00-FFFF are vendor-defined) to avoid malfunctions of new devices being wrongly recognized by an operation system of the computer device 20 or other applications. After the computer device 20 executes the cursor application 21 to register the vendor-defined usage page associated with the digital pen 10, the digital pen 10 can be controlled and functional.

Next, as step S4 and step S5: after the computer device 20 executes the cursor application 21 to register the vendor-defined usage page associated with the digital pen 10, the computer device 20 can receive the coordinate position (X, Y) or the displacement amount ($\Delta X$, $\Delta Y$) transmitted by the digital pen 10 to execute the cursor application 21 to generate the cursor icon C displaying on the display 24 according to the vendor-defined usage page and the coordinate position (X, Y) (as shown in FIG. 3, the cursor icon C can be a simulated laser dot or other patterns) and control the shifting of the cursor icon C according to the vendor-defined usage page and the displacement amount ($\Delta X$, $\Delta Y$) caused by displacements of the digital pen 10 (please refer to FIG. 3 and FIG. 4). For example, the computer device 20 can compare the coordinate position (X, Y) and the displacement amount ($\Delta X$, $\Delta Y$) of the digital pen 10 to obtain a shift direction and a shift velocity of the digital pen 10 to control the shifting of the cursor icon C on the display 24 corresponding to the shift direction and the shift velocity. In an embodiment, the cursor application 21 can immediately generate the cursor icon C displaying on a predetermined position of the display 24 (e.g., the center of the display 24) according to the vendor-defined usage page with no need of the coordinate position (X, Y) transmitted by the digital pen 10. In addition, as shown in FIG. 3 and FIG. 4, the computer device 20 is connected to the extended display 30 (e.g., a large TV screen or a projector curtain), by which the extended display 30 and the display 24 of the computer device 20 can be set to display the same contents simultaneously. Thus, a cursor icon Cl displays on the extended display 30 while the cursor icon C displays on the display 24. When the cursor icon C shifts on the display 24, the cursor icon Cl shifts on the extended display 30 correspondingly, which facilitates the reporting on the conference proceeding.

Concisely, according to the embodiments of the instant disclosure, the computer device 20 can execute the cursor application 21 to display the cursor icon C on the display 24 and control the shifting of the cursor icon C on the display 24 by the interaction of signals between the digital pen 10 and the computer device 20; therefore, the digital pen 10 can perform indications with no need of emitting laser beam so as to avoid risks of hurting human eyes. The brightness of the cursor icon C is unaffected by the display and won't weaken even if the distance between the digital pen 10 and the display increases. As a result, the effect of indication is significantly improved and clearer.

Figure 5:
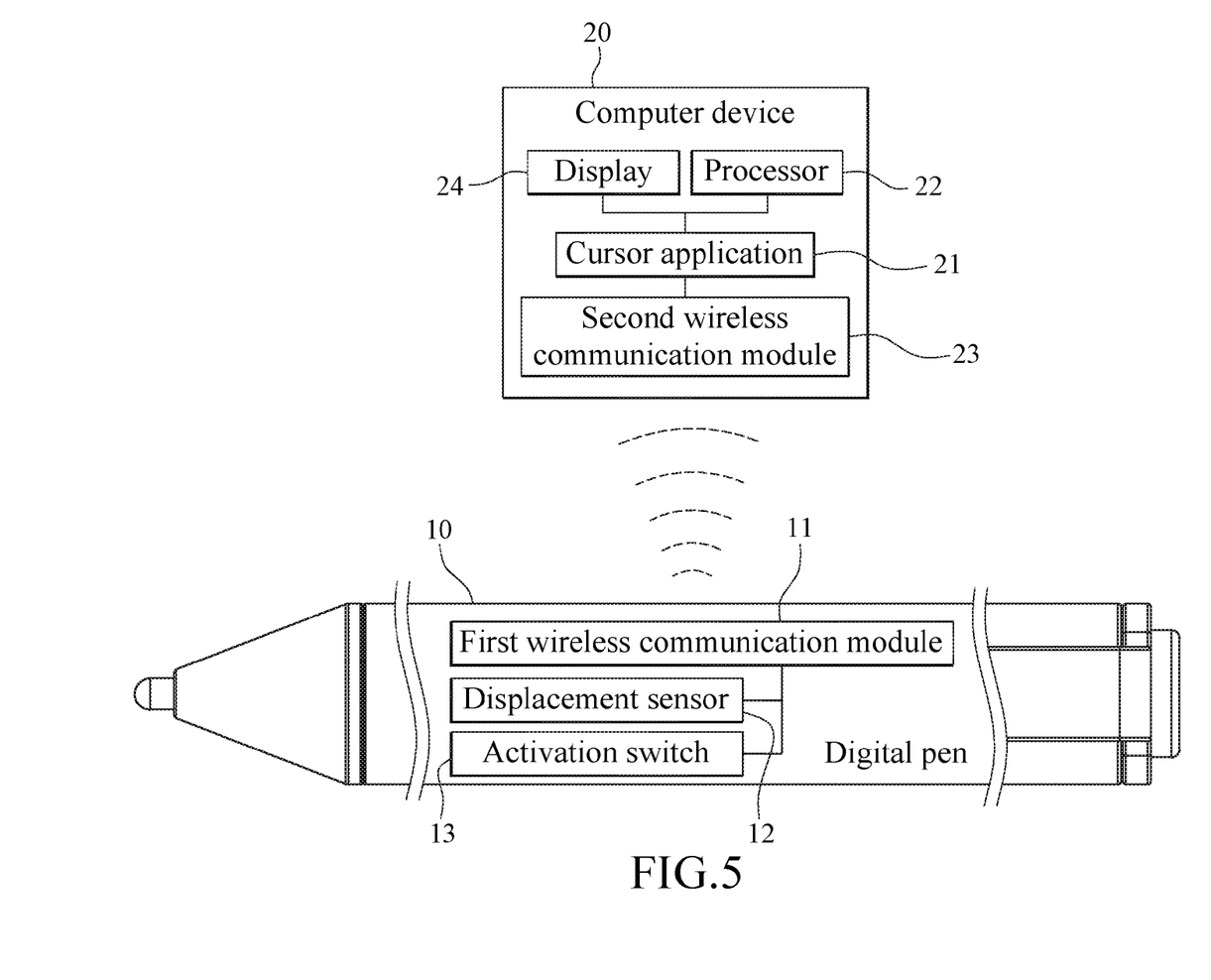
FIG. 5 illustrates a system block diagram of a cursor generation system according to a second embodiment of the instant disclosure.
Figure 6:
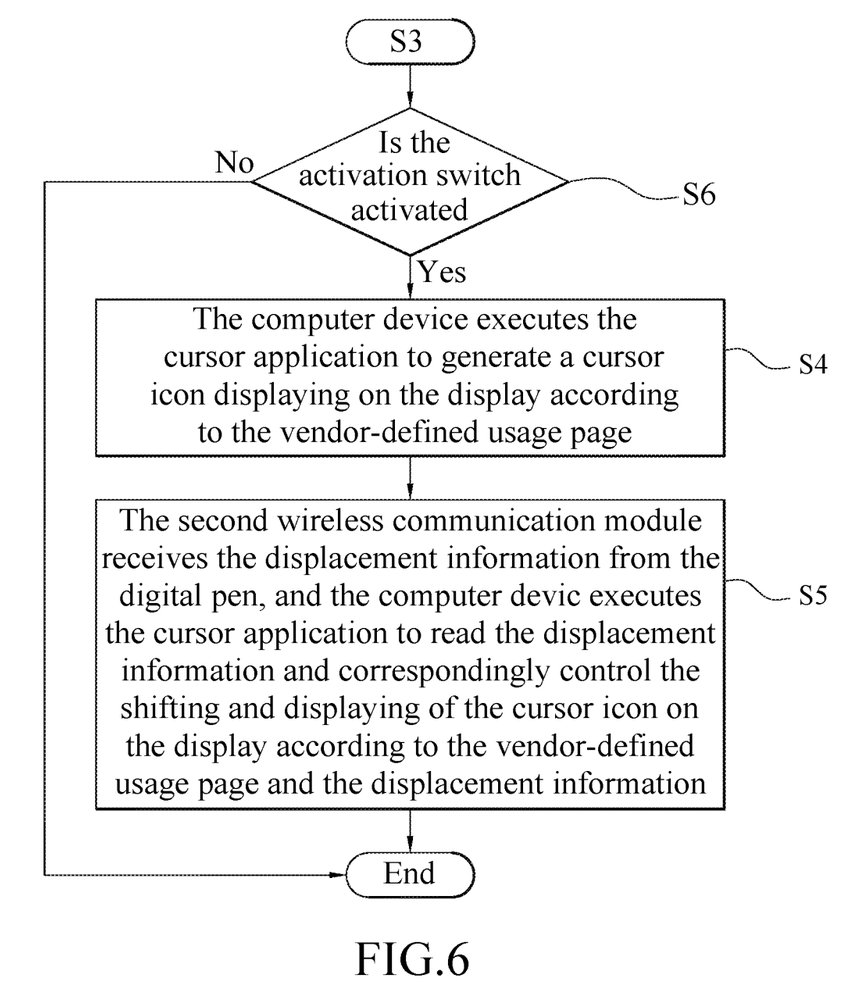
FIG. 6 illustrates a flow chart of a cursor generation method according to the second embodiment of the instant disclosure.

As shown in FIGS. 3-5, in an embodiment, the digital pen 10 further comprises an activation switch 13 (e.g., a button or a key). When a user presses the activation switch 13, the first wireless communication module 11 is then able to output the displacement information of the digital pen 10, by which the computer device 20 is then able to execute the cursor application 21 to generate the cursor icon C displaying on the display 24 and control the shifting of the cursor icon C on the display 24. Please refer to FIG. 6, which is a flow chart of a cursor generation method according to the second embodiment of the instant disclosure. In the embodiment, the cursor application 21 determines whether the activation switch 13 is activated (step S6) in advance. When the user presses the activation switch 13, the second wireless communication module 23 of the computer device 20 is then able to receive the displacement information of the digital pen 10 outputted by the first wireless communication module 11 to display the cursor icon C and control the shifting of the cursor icon C on the display 24 (as the steps S4 and S5). On the other hand, if the activation switch 13 is not activated by the user, the cursor icon C is vanished from the display 24 to avoid blocking report contents. In some embodiments, the first wireless communication module 11 continuously outputs the displacement information of the digital pen 10 even if the activation switch 13 is not activated, and the cursor application 21 generates the cursor icon C displaying on the display 24 once when the user presses the activation switch 13.

Figure 7:
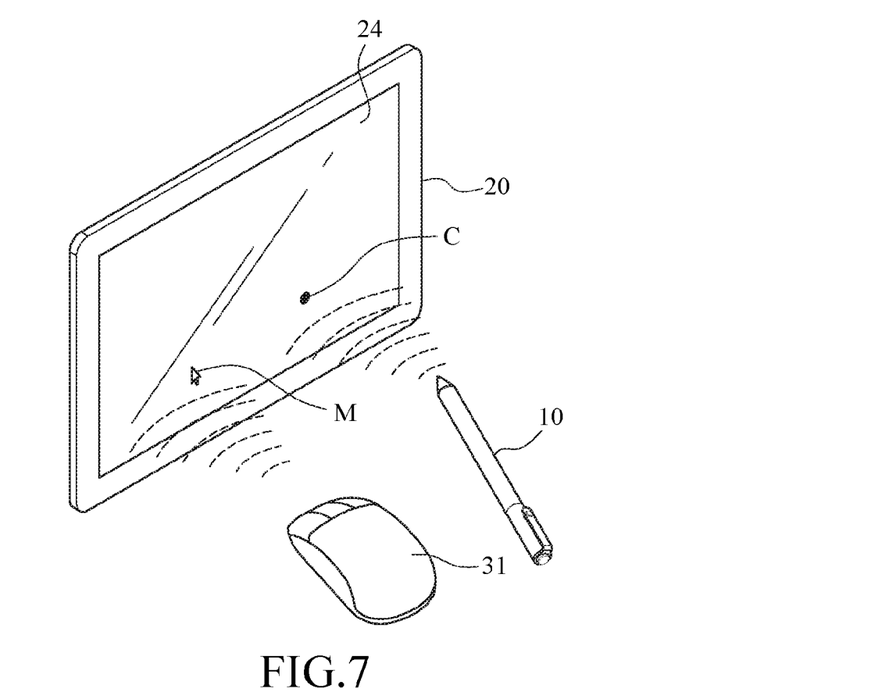
FIG. 7 illustrates a perspective view regarding system operation of the cursor generation system according to another embodiment of the instant disclosure.

As shown in FIG. 7, in an embodiment, the digital pen 10 is a vendor-defined device and therefore can operate together with a generic control device 31 (e.g., a mouse or an air mouse) in the same time. As shown in FIG. 7, the computer device 20 can execute the cursor application 21 corresponding to the digital pen 10 to generate the cursor icon C (e.g., a simulated laser dot) displaying on the display 24 according to the vendor-defined usage page and can control the shifting of the cursor icon C according to the vendor-defined usage page and the displacement information caused by displacements of the digital pen 10 (as shown in FIG. 4). Further, the computer device 20 can generate a mouse cursor icon M displaying on the display 24 together with the cursor icon C according to the generic desktop usage page in response to an input of a generic control device 31 (e.g., a mouse or an air mouse).

Figure 8:
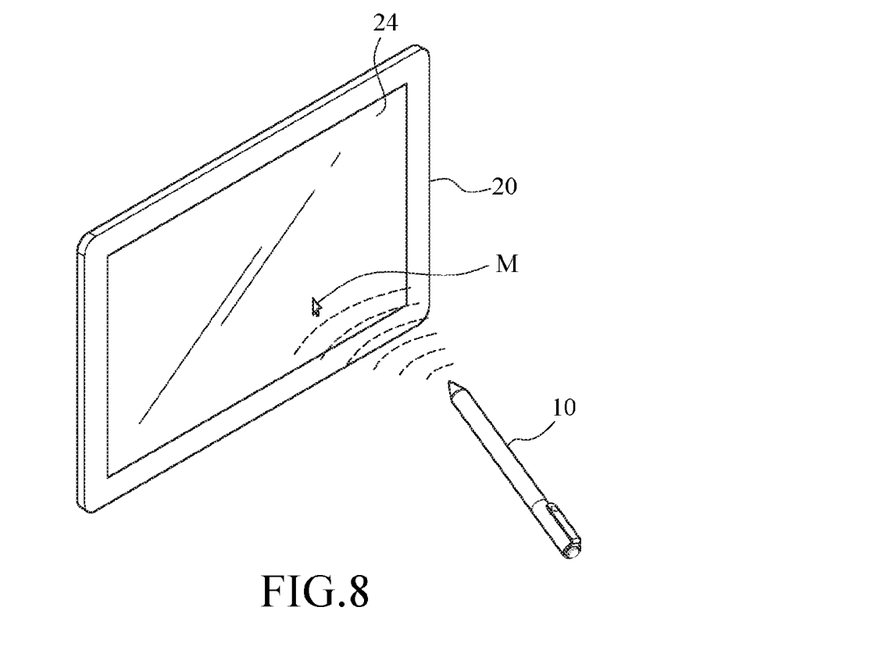
FIG. 8 illustrates a perspective view regarding system operation of the cursor generation system according to another embodiment of the instant disclosure.

Alternatively, as shown in FIG. 8, the computer device 20 generates a mouse cursor icon M displaying on the display 24 according to the generic desktop usage page in response to an altering signal transmitted by the first wireless communication module 11. The computer device 20 reads the displacement information of the digital pen 10 and correspondingly controls the shifting and displaying of the mouse cursor icon M on the display 24 according to the generic desktop usage page. For example, a user can press a switch of the digital pen 10 to have the first wireless communication module 11 transmit the altering signal. The altering signal can comprise the recognition information corresponding to the generic desktop usage page so that the computer device 20 can recognize the digital pen 10 as a generic device according to the recognition information to generate the generic mouse cursor icon M displaying on the display 24 according to the generic desktop usage page. The computer device 20 can return to execute the cursor application 21 to generate the cursor icon C displaying on the display 24 according to the vendor-defined usage page in response to a returning signal transmitted by the first wireless communication module 11 (for example, the returning signal is transmitted when the user presses another switch of the digital pen 10), and can read the displacement information and control the shifting and displaying of the cursor icon C on the display 24 according to the vendor-defined usage page. As a result, the digital pen 10 is capable of selectively generating the mouse cursor icon M or the cursor icon C depending on the needs.

In an embodiment, the computer device 20 can execute the cursor application 21 to set a movable range of the cursor icon C on the display 24. For example, the movable range can be restricted by edges of the display 24 (as shown in FIG. 4) to prevent the cursor icon C from shifting over the edges of the display 24 which may negatively affect the operation. In some embodiments, the movable range can be, but not limited to, narrower than the area defined by the edges of the display 24 according to a user setting.

In addition, the cursor application 21 can control the shifting of the cursor icon C on the display 24 according to embodiments below.

In an embodiment, the cursor application 21 can calculate a displacement velocity ($\Delta V_X$, $\Delta V_Y$) of the digital pen 10 according to the displacement information and control a shift velocity of the cursor icon C on the display 24 according to the displacement velocity of the digital pen 10, by which a displacement amount of the digital pen 10 is the same as that of the cursor icon C. For example, the displacement velocity of the digital pen 10 is V, and the shift velocity of the cursor icon C on the display 24 controlled by the cursor application 21 is also V.

Figure 9:
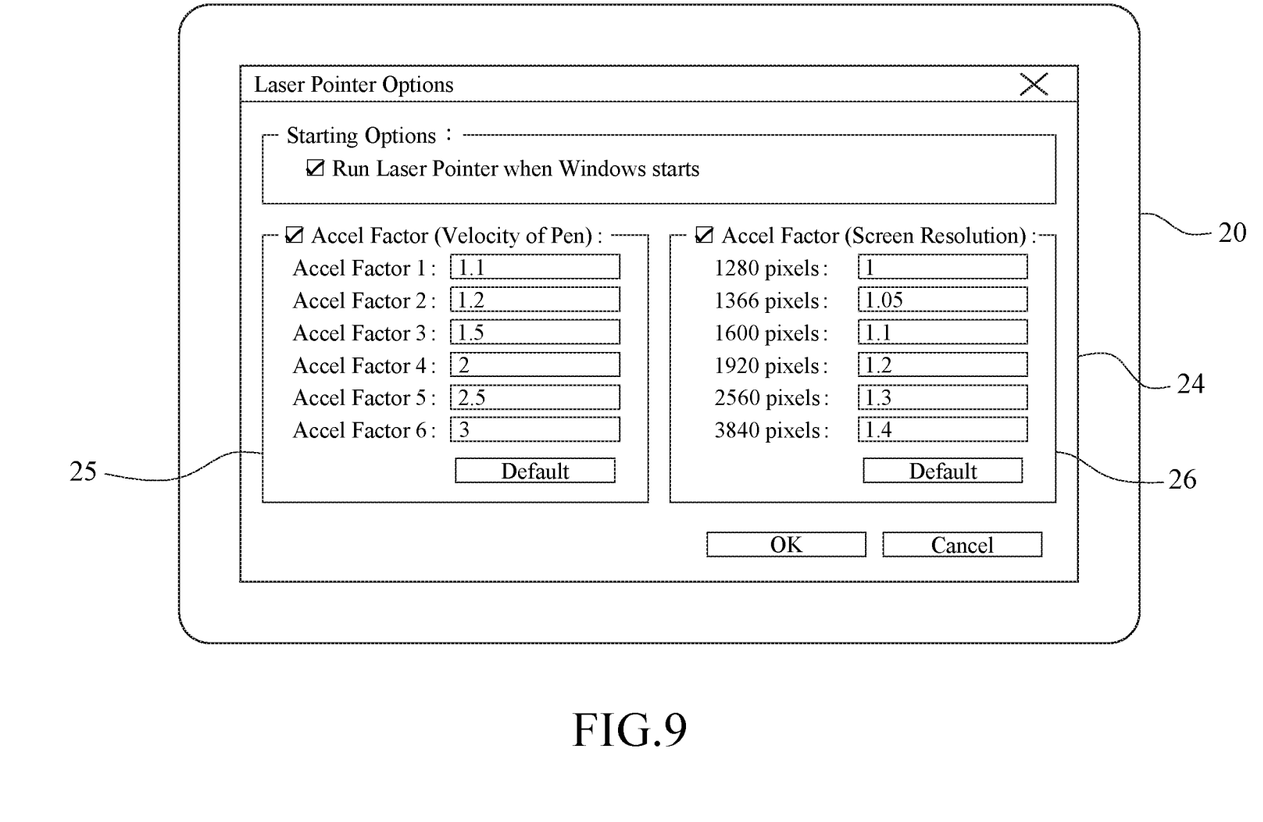
FIG. 9 illustrates a setting page of a cursor application according to an embodiment of the instant disclosure.
Figure 10:
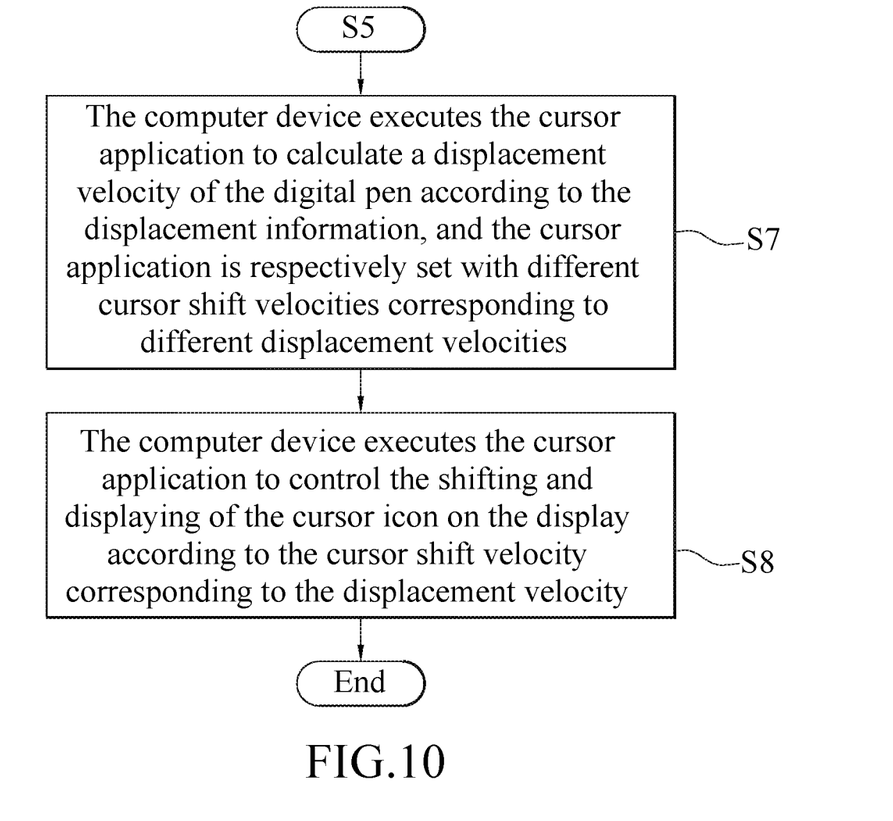
FIG. 10 illustrates a flow chart of a cursor generation method according to a third embodiment of the instant disclosure.

As shown in FIG. 10, in an embodiment, the cursor application 21 can calculate a displacement velocity ($\Delta V_x$, $\Delta V_y$) of the digital pen 10 according to the displacement information and the cursor application 21 is respectively set with different cursor velocities corresponding to different displacement velocities (as step S7). The cursor application 21 controls the shifting and displaying of the cursor icon C on the display 24 according to the cursor velocity corresponding to the displacement velocity (as step S8). For example, if the displacement velocity of the digital pen 10 is V, the cursor velocity corresponding to the displacement velocity can be 1.2V. If the displacement velocity of the digital pen 10 is 1.2V, the cursor velocity corresponding to the displacement velocity can be 1.5V; therefore, the displacement amount of the digital pen 10 is different from that of the cursor icon C. Please refer to FIG. 9. The cursor application 21 can display a setting page 25 on the display 24 according to an operation of a user. The user can manually set the cursor velocity corresponding to the displacement velocity of the digital pen 10 to meet the needs of users.

Figure 11:
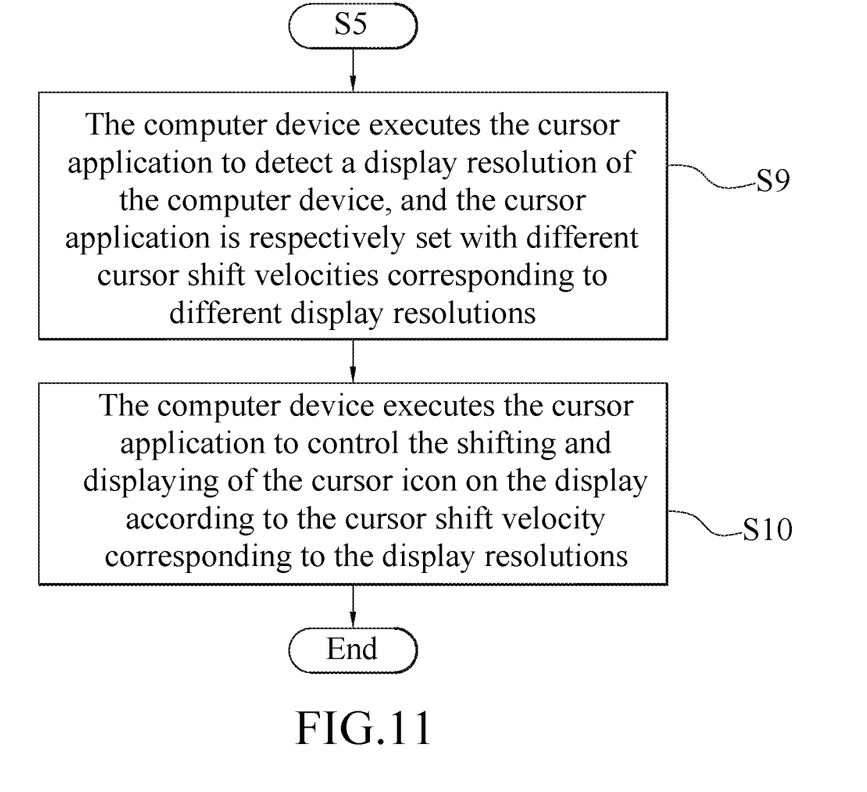
FIG. 11 illustrates a flow chart of a cursor generation method according to a fourth embodiment of the instant disclosure.

As shown in FIG. 11, in an embodiment, the computer device 20 can execute the cursor application 21 to detect a display resolution of the computer device 20. The cursor application 21 is respectively set with different cursor shift velocities corresponding to different display resolutions (as step S9). The cursor application 21 controls the shifting and displaying of the cursor icon C on the display 24 according to the cursor shift velocities corresponding to the display resolutions (as step 10). For example, if the displacement velocity of the digital pen 10 is V, the cursor shift velocity corresponding to the displacement velocity can be V when the display resolution of the computer device 20 or the extended display 30 detected by the cursor application 21 is 1280 pixels. The corresponding cursor shift velocity can be 1.05V when the display resolution of the computer device 20 or the extended display 30 detected by the cursor application 21 is 1366 pixels. The corresponding cursor shift velocity can be 1.1V when the display resolution of the computer device 20 or the extended display 30 detected by the cursor application 21 is 1600 pixels. Please refer to a setting page 26 of FIG. 9. As a result, users can select a proper cursor shift velocity according to the computer device 20 with different display resolutions. As shown in FIG. 9, the cursor application 21 can display the setting page 26 on the display 24 based upon an operation of a user allowing the user to manually set the cursor shift velocity corresponding to the displacement velocity of the digital pen 10 to meet the needs. Please refer to FIG. 4 again. The cursor application 21 can respectively detect the display resolutions of the computer device 20 and the extended display 30 to respectively control the cursor shift velocities of the cursor icon on the computer device 20 and the extended display 30. For example, when the display resolution of the computer device 20 detected by the cursor application 21 is 1280 pixels, and the display resolution of the extended display 30 detected by the cursor application 21 is 1600 pixels, the cursor shift velocity of the cursor icon C controlled by the cursor application 21 is V, and the cursor shift velocity of the cursor icon C1 controlled by the cursor application 21 is 1.1V, by which the cursor icons C, C1 can have different displacement amounts corresponding to different display resolutions.

Figure 12:
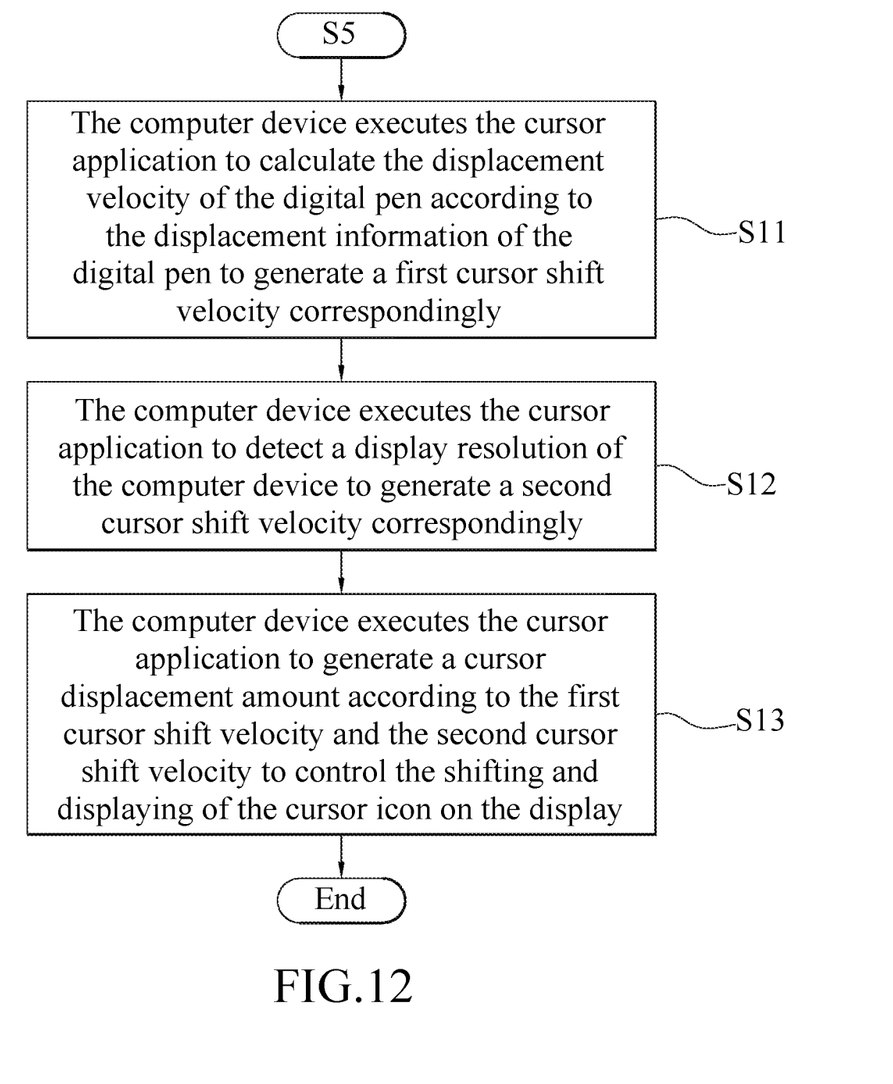
FIG. 12 illustrates a flow chart of a cursor generation method according to a fifth embodiment of the instant disclosure.

As shown in FIG. 12, in an embodiment, the cursor application 21 calculates the displacement velocity of the digital pen 10 according to the displacement information of the digital pen 10 to generate a first cursor shift velocity correspondingly (as step S11). For example, the displacement velocity is V, and the corresponding first cursor shift velocity is 1.1V. The cursor application 21 detects a display resolution of the computer device 20 to generate a second cursor shift velocity correspondingly (as step S12). For example, when the display resolution of the computer device 20 is 1366 pixels, and the corresponding second cursor shift velocity is 1.05V, the cursor application 21 can generate a new cursor displacement amount (ΔX, ΔY) according to the first cursor shift velocity and the second cursor shift velocity to control the shifting and displaying of the cursor icon C on the display 24 (as step S13). For example, the cursor application 21 generates the new cursor displacement amount (ΔX, ΔY) according to a synergy of the first cursor shift velocity and the second cursor shift velocity. In some embodiments, the cursor application 21 can calculate a new cursor displacement amount (ΔX, ΔY) according to the first cursor shift velocity or the second cursor shift velocity individually to control the shifting and displaying of the cursor icon C on the display 24.

According to an embodiment of the instant disclosure, a non-transitory computer readable storage medium (e.g., a disc, a USB device, or a memory card) having a computer program is provided. The computer program can be loaded and implemented by the computer device 20 and cause the computer device 20 to carry out the above steps of embodiments (the steps S2-S13).

In an embodiment, the computer program can be a downloadable application stored in a non-transitory computer readable storage medium of a network server providing a network platform (e.g., the App store of Apple Inc.) and can be downloaded to a non-transitory computer readable storage medium of the computer device 20. The computer program can be loaded and implemented by the computer device 20 and cause the computer device 20 to carry out the above steps of embodiments (the steps S2-S13).

While the instant disclosure has been described by way of example and in terms of the preferred embodiments, it is to be understood that the instant disclosure needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. A cursor generation system, comprising:
a digital pen comprising recognition information, a first wireless communication module, and a displacement sensor, the first wireless communication module being electrically connected to the displacement sensor, the displacement sensor detecting displacements of the digital pen in three-dimensional space to obtain displacement information, the first wireless communication module being for transmitting a mating request signal, the recognition information, and the displacement information; and
a computer device comprising a cursor application, a processor, a second wireless communication module, and a display, the cursor application being associated with the recognition information of the digital pen, the processor being respectively electrically connected to the second wireless communication module and the display, the second wireless communication module receiving the mating request signal and mating with the first wireless communication module to wirelessly receive the recognition information and the displacement information,
wherein the processer executes the cursor application corresponding to the recognition information to register a vendor-defined usage page associated with the digital pen, wherein the processor executes the cursor application to generate a cursor icon displaying on the display according to the vendor-defined usage page, wherein the processor reads the displacement information and controls the shifting and displaying of the cursor icon on the display according to the vendor-defined usage page and the displacement information;
wherein the processer further executes the cursor application to detect a display resolution of an extended display, wherein the extended display is connected to the computer device, and the cursor application is respectively set with different cursor shift velocities corresponding to different display resolutions of the extended display, wherein the cursor application further controls the shifting and displaying of another cursor icon on the extended display according to the cursor shift velocity corresponding to the display resolution.

2. The cursor generation system of claim 1, wherein the displacement information comprises a coordinate position or a displacement amount.

3. The cursor generation system of claim 1, wherein the digital pen further comprises an activation switch, and the cursor application generates the cursor on the display according to the vendor-defined usage page when the activation switch is activated.

4. The cursor generation system of claim 3, wherein the activation switch is connected to the first wireless communication module, and the first wireless communication module transmits the displacement information when the activation switch is activated.

5. The cursor generation system of claim 1, wherein the computer device further comprises a built-in generic desktop usage page, the processor further generates a mouse cursor icon displaying on the display together with the cursor icon according to the generic desktop usage page in response to an input of a generic control device.

6. The cursor generation system of claim 1, wherein the computer device further comprises a built-in generic desktop usage page, the processor selectively alters to generate a mouse cursor icon displaying on the display according to the generic desktop usage page in response to an altering signal transmitted by the first wireless communication module, and the processor reads the displacement information and controls the shifting and displaying of the mouse cursor icon on the display according to the generic desktop usage page; or the processor selectively returns to execute the cursor application to generate the cursor icon displaying on the display according to the vendor-defined usage page in response to a returning signal transmitted by the first wireless communication module, and the processor reads the displacement information and controls the shifting and displaying of the cursor icon on the display according to the vendor-defined usage page.

7. The cursor generation system of claim 1, wherein the processor further executes the cursor application to calculate a displacement velocity of the digital pen according to the displacement information, the cursor application is respectively set with different cursor velocities corresponding to different displacement velocities, and the cursor application controls the shifting and displaying of the cursor icon on the display according to the cursor velocities corresponding to the displacement velocities.

8. The cursor generation system of claim 1, wherein the processor further executes the cursor application to set a movable range of the cursor icon on the display.

9. A cursor generation method, comprising:
receiving a mating request signal transmitted by a first wireless communication module of a digital pen by a computer device, wherein a second wireless communication module of the computer device receives the mating request signal and mates with the first wireless communication module, wherein the digital pen comprises a recognition information;
executing a cursor application corresponding to the recognition information to register a vendor-defined usage page associated with the digital pen by the computer device;
executing the cursor application to generate a cursor icon displaying on a display according to the vendor-defined usage page by the computer device;
receiving a displacement information from the digital pen by the second wireless communication module, the displacement information is obtained by a displacement sensor detecting displacements of the digital pen in three-dimensional space, wherein the computer device executes the cursor application to read the displacement information and control the shifting and displaying of the cursor icon on the display according to the vendor-defined usage page and the displacement information;
executing the cursor application to detect a display resolution of an extended display by the computer device, wherein the extended display is connected to the computer device, and the cursor application is set with different cursor shift velocities corresponding to different display resolutions of the extended display; and
executing the cursor application to control the shifting and displaying of another cursor icon on the extended display according to the cursor shift velocity corresponding to the display resolution by the computer device.

10. The cursor generation method of claim 9, wherein the first wireless communication module transmits the displacement information when an activation switch of the digital pen is activated.

11. The cursor generation method of claim 9 further comprising: generating a mouse cursor icon displaying on the display together with the cursor icon according to a generic desktop usage page in response to an input of a generic control device by the computer device.

12. The cursor generation method of claim 9 further comprising: selectively altering to generate a mouse cursor icon displaying on the display according to a generic desktop usage page in response to an altering signal transmitted by the first wireless communication module by the computer device, and reading the displacement information and controlling the shifting and displaying of the mouse cursor icon on the display according to the generic desktop usage page by the computer device; or selectively returning to execute the cursor application to generate the cursor icon displaying on the display according to the vendor-defined usage page in response to a returning signal transmitted by the first wireless communication module by the computer device, and reading the displacement information and controlling the shifting and displaying of the cursor icon on the display according to the vendor-defined usage page by the computer device.

13. The cursor generation method of claim 9 further comprising:
executing the cursor application to calculate a displacement velocity of the digital pen according to the displacement information by the computer device, wherein the cursor application is respectively set with different cursor velocities corresponding to different displacement velocities; and
executing the cursor application to control the shifting and displaying of the cursor icon on the display according to the cursor velocities corresponding to the displacement velocities by the computer device.

14. The cursor generation method of claim 9 further comprising:
executing the cursor application to calculate a displacement velocity of the digital pen according to the displacement information to generate a first cursor shift velocity correspondingly by the computer device;
executing the cursor application to detect a display resolution of the computer device to generate a second cursor shift velocity correspondingly by the computer device; and
executing the cursor application to generate a cursor displacement amount according to the first cursor shift velocity and the second cursor shift velocity to control the shifting and displaying of the cursor icon on the display by the computer device.

15. The cursor generation method of claim 9 further comprising: executing the cursor application to set a movable range of the cursor icon on the display by the computer device.

16. A non-transitory computer readable storage medium having a computer program which, when implemented, causes a computer device to carry out a plurality of method steps comprising:
registering a vendor-defined usage page associated with a digital pen, wherein the digital pen is an external device distinct from the computer device;
generating a cursor icon displaying on a display of the computer device according to the vendor-defined usage page;

reading a displacement information from the digital pen and controlling the shifting and displaying of the cursor icon on the display according to the vendor-defined usage page and the displacement information, the displacement information is obtained by a displacement sensor detecting displacements of the digital pen in three-dimensional space;

detecting a display resolution of an extended display, wherein the extended display is connected to the computer device, wherein the display resolution is corresponding to one of a plurality of cursor shift velocities being default; and controlling the shifting and displaying of another cursor icon on the extended display according to the cursor shift velocity correspondingly to the display resolution.

17. The non-transitory computer readable storage medium of claim 16, wherein the method steps further comprise:

calculating a displacement velocity of the digital pen according to the displacement information, wherein the displacement velocity is corresponding to one of a plurality of cursor velocities being default; and controlling the shifting and displaying of the cursor icon on the display according to the cursor velocity correspondingly to the displacement velocity.

18. The non-transitory computer readable storage medium of claim 16, wherein the method steps further comprise:

calculating a displacement velocity of the digital pen according to the displacement information to generate a first cursor shift velocity correspondingly;

detecting a display resolution of the computer device to generate a second cursor shift velocity correspondingly; and generating a cursor displacement amount according to the first cursor shift velocity and the second cursor shift velocity to control the shifting and displaying of the cursor icon on the display.

19. The non-transitory computer readable storage medium of claim 16, wherein the method steps further comprise: setting a movable range of the cursor icon on the display.

* * * * *